(12) United States Patent
Nam et al.

(10) Patent No.: US 9,106,907 B2
(45) Date of Patent: Aug. 11, 2015

(54) STEREOSCOPIC DISPLAY DEVICE AND DRIVING METHOD THEREOF

(75) Inventors: Hui Nam, Yongin (KR); Beom-Shik Kim, Yongin (KR); Keum-Nam Kim, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 994 days.

(21) Appl. No.: 13/137,915

(22) Filed: Sep. 21, 2011

(65) Prior Publication Data

US 2012/0105605 A1 May 3, 2012

(30) Foreign Application Priority Data

Oct. 27, 2010 (KR) .................... 10-2010-0105403

(51) Int. Cl.
*H04N 13/04* (2006.01)
*G09G 3/00* (2006.01)
*G09G 3/32* (2006.01)

(52) U.S. Cl.
CPC ........... *H04N 13/0438* (2013.01); *G09G 3/003* (2013.01); *G09G 3/3233* (2013.01); *G09G 2300/0842* (2013.01); *G09G 2300/0861* (2013.01); *G09G 2310/0216* (2013.01); *G09G 2310/0218* (2013.01); *G09G 2310/08* (2013.01); *G09G 2320/0209* (2013.01)

(58) Field of Classification Search
CPC .................... G02B 27/2228; H04N 13/0429
USPC .......................................................... 349/11
See application file for complete search history.

(56) References Cited

U.S. PATENT DOCUMENTS

| 2007/0229395 | A1 | 10/2007 | Slavenburg et al. |
| 2010/0091207 | A1 | 4/2010 | Hasegawa et al. |
| 2012/0050274 | A1* | 3/2012 | Yoo et al. ................ 345/419 |

FOREIGN PATENT DOCUMENTS

| CN | 101577088 A | 11/2009 |
| CN | 101794549 A | 8/2010 |
| JP | 2010-093740 A | 4/2010 |
| KR | 10-2007-0070327 A | 7/2007 |
| KR | 10-2008-0055081 A | 6/2008 |
| WO | WO 2007/021458 A1 | 2/2007 |
| WO | WO 2010/071193 A1 | 6/2010 |
| WO | WO 2010/082479 A1 | 7/2010 |

* cited by examiner

*Primary Examiner* — Amare Mengistu
*Assistant Examiner* — Shawna Stepp Jones
(74) *Attorney, Agent, or Firm* — Lee & Morse, P.C.

(57) ABSTRACT

A stereoscopic display device includes a scan driver, a data driver, a light emission driver, a display unit including a first region and a second region with pixel lines, and a controller. The light emission driver is configured to transmit a plurality of first light emission control signals to pixels to emit light in the first region and a plurality of second light emission control signals to pixels to emit light in the second region after corresponding scan signals are transmitted to respective pixels in the first and second regions, the first light emission control signals being separated from corresponding scan signals by respective first periods, and the second light emission control signals overlapping in time with corresponding scan signals.

22 Claims, 4 Drawing Sheets

STEREOSCOPIC DISPLAY DEVICE AND DRIVING METHOD THEREOF

BACKGROUND

1. Field

Example embodiments relate to a stereoscopic display device and a driving method thereof. More particularly, example embodiments relate to a stereoscopic display device and a driving method thereof that can implement high quality luminance while ensuring sufficiently low driving speed thereof.

2. Description of the Related Art

In recent years, diversified flat panel displays with reduced weight and volume, e.g., as compared to a cathode ray tube, have been developed. Examples of the flat panel displays may include a liquid crystal display (LCD), a field emission display (FED), a plasma display panel (PDP), and an organic light emitting diode (OLED) display.

For example, among the flat panel displays, the OLED display, i.e., a display which displays an image by using an OLED generating light by recombination of electrons and holes, is driven at low power consumption. Further, the OLED display may exhibit a rapid response speed and excellent emission efficiency, luminance, and viewing angle.

In general, the OLED display may include a plurality of pixels with OLEDs which emit light. The OLEDs generate light having a predetermined luminance to correspond to data current supplied form a pixel circuit.

A conventional OLED display may be driven digitally, i.e., one of gray expression methods that adjusts the time when the OLED of the pixel is turned on. In the case that the OLED display follows the digital driving method, one frame is divided into a plurality of subframes, and a light emitting period of each subframe is appropriately set in order to display gray expression. The pixel emits light during a subframe selected with respect to an image signal for gray expression among the plurality of subframes constituting one frame.

Meanwhile, in order to display a stereoscopic image, at least two images corresponding to two different view points should be displayed within one frame display period. For example, a conventional stereoscopic display device, i.e., a stereopsis display device, displays a left-eye image and a right-eye image corresponding to respective left and right human eyes within one frame period.

That is, one frame period is divided into a left-eye image section and a right-eye image section. The one frame period includes a left-eye image display period displaying the left-eye image in the left-eye image section, and a right-eye image display period displaying the right-eye image in the right-eye image section.

The above information disclosed in this Background section is only for enhancement of understanding of the background of the invention and therefore it may contain information that does not form the prior art that is already known in this country to a person of ordinary skill in the art.

SUMMARY

Embodiments are directed to a stereoscopic display device and a method of driving thereof, which substantially overcome one or more of the problems due to the limitations and disadvantages of the related art.

It is therefore a feature of an embodiment to provide a stereoscopic display device capable of maintaining good luminance while lowering a driving frequency, as compared with a conventional stereoscopic display device, e.g., an existing shutter spectacles type displaying a 3D stereoscopic display device.

It is therefore another feature of an embodiment to provide a stereoscopic display device exhibiting high 3D image quality without crosstalk phenomenon by fully separating a left eye image and a right eye image from each other, while being driven at a low driving speed and maintaining luminance.

It is yet another feature of an embodiment to provide a method of driving a stereoscopic display device having one or more of the above features.

At least one of the above and other features and advantages may be realized by providing a stereoscopic display device, including a scan driver configured to transmit a plurality of scan signals to a plurality of scan lines, a data driver configured to transmit a plurality of data signals to a plurality of data lines, a light emission driver configured to transmit a plurality of light emission control signals to a plurality of light emission control lines, a display unit including a first region and a second region, each of the first and second regions including at least one pixel line having a plurality of pixels connected to corresponding scan lines, data lines, and light emission lines, and a controller configured to control the scan driver, the data driver, and the light emission driver, to generate an image data signal corresponding to each of a first view point image display period and a second view point image display period for one frame, and to supply the image data signal to the data driver, wherein the light emission driver is configured to transmit a plurality of first light emission control signals to pixels to emit light in the first region and a plurality of second light emission control signals to pixels to emit light in the second region after corresponding scan signals are transmitted to respective pixels in the first and second regions, the first light emission control signals being separated from corresponding scan signals by respective first periods, and the second light emission control signals overlapping in time with corresponding scan signals.

A light emission time of each of the plurality of pixels in the first region may be the same as a light emission time of each of the plurality of pixels in the second region. A light emission time of the plurality of pixels in the first and second regions may be equal to or lower than about ½ of respective first and second view point image display periods. A light emitting duty of the plurality of pixels in the first and second regions may be about ½ of respective first and second view point image display periods. Each of the plurality of the first light emission control signals may be transmitted with a "gate-on" voltage level to a light emission control transistor in each of the plurality of pixels, the plurality of the first light emission control signals being synchronized with ending times of corresponding first periods, and each of the plurality of the second light emission control signals may be transmitted with a "gate-on" voltage level to the light emission control transistor, the second light emission control signals being synchronized with transmission ending times of corresponding scan signals. The first periods for the plurality of pixels in the first region may have a substantially same length of time. The first periods may be equal to or longer than ½ of the first view point image display period or the second view point image display period.

A driving speed of the scan signal transmitted to each of the plurality of pixels in the first region may be substantially the same as a driving speed of the plurality of first light emission control signals, and a driving speed of the scan signal transmitted to each of the plurality of pixels in the second region may be substantially the same as a driving speed of the plurality of second light emission control signals. The first region may include at least one pixel line of a total number of pixel lines in the display unit, and the second region includes remaining pixel lines of the display unit not included in the first region. The first region may include up to n/2 pixel lines among a total of n pixel lines in the display unit (n being a natural number), the n/2 pixel lines being arranged from a first pixel line of the display unit, and the second region includes remaining pixel lines of the display unit not included in the first region. The first periods may be non-emission periods, a length of all the first periods being substantially the same. The non-emission periods may be equal to or longer than ½ of a first view point image display period or a second view point image display period. A driving frequency of the scan signal transmitted to the plurality of pixel lines of the display unit may equal two times a frequency of one frame. Each of the plurality of pixels in each of the first region and the second region during the first view point image display period may emit light in accordance with a first view point image data signal corresponding to the first view point image display period, a first view point shutter spectacles being turned on during the light emission, and each of the plurality of pixels in each of the first region and the second region during the second view point image display period may emit light in accordance with a second view point image data signal corresponding to the second view point image display period, a second view point shutter spectacles being turned on during the light emission.

At least one of the above and other features and advantages may be realized by providing a driving method of a stereoscopic display device having a display unit with first and second regions, each of the first and second regions including at least one pixel line having a plurality of pixels connected to corresponding scan lines, data lines, and light emission lines, and a controller configured to generate and supply first and second view point image data signals corresponding to respective first and second view point image display periods for one frame, the method including transmitting a scan signal to each of the plurality of pixels in the first region and the second region during the first view point image display period, emitting light from the plurality of pixels in the first region in accordance with the first view point image data signal, the light emission in the first region and receipt of a corresponding transmitted scan signal being separated by a first period, emitting light from the pixels in the second region in accordance with the first view point image data signal, the light emission in the second region overlapping in time with a corresponding scan signal, transmitting a scan signal to each of the plurality of pixels in the first region and the second region during the second view point image display period, emitting light from the pixels in the first region in accordance with the second view point image data signal, the light emission in the first region and receipt of a corresponding transmitted scan signal being separated by a second period, and emitting light from the pixels in the second region in accordance with the second view point image data signal, the light emission in the second region overlapping in time with a corresponding scan signal.

Transmitting scan signals to the plurality of pixels may include using a scan signal driving speed in each of the first and second regions that is two times a frequency of one frame. Emitting light from the first and second regions in accordance with the first view point image data signal may occur when the first view point shutter spectacles is open, and emitting light from the first and second regions in accordance with the second view point image data signal may occur when the second view point shutter spectacles is open. Emitting light from each of the plurality of pixels in the first region may have a substantially same duration as emitting light from each of the plurality of pixels in the second region. A light emitting duty of each of the plurality of pixels in the first region and the second region may be about ½ of the first view point image display period or the second view point image display period. The first and second periods may have a substantially same length. The first period and the second period may be equal to or longer than about ½ of the first view point image display period or the second view point image display period. A driving speed of the scan signal transmitted to the plurality of pixel lines in the first region and the second region may be the same as the driving speed of the light emission control signal.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0105403, filed on Oct. 27, 2010, in the Korean Intellectual Property Office, and entitled: "Stereopsis Display Device and Driving Method Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Further, it will also be understood that when an element is referred to as being "coupled" to another element, the element may be "directly coupled," "indirectly coupled," or "electrically coupled" to the other element. In addition, unless explicitly described to the contrary, the word "comprise" and variations such as "comprises" or "comprising", will be understood to imply the inclusion of stated elements but not the exclusion of any other elements. Like reference numerals refer to like elements throughout.

Hereinafter, an implementation method of a 3D stereoscopic image implemented during one frame will be described with respect to a conventional stereoscopic display device according to a field progressive driving scheme.

In an existing 3D driving method of a conventional stereoscopic display device, one frame is divided into a left eye image period and a right eye image period. Further, each of the left and right eye periods is divided into an image display period and a black image display period according to a corresponding viewpoint.

That is, the left eye image period may include a left eye image display period, i.e., in which a left eye image is displayed, and a black image display period. Further, the right eye image period may include a right eye image display period, i.e., in which a right eye image is displayed, and a black image display period.

The left eye image period and the right eye image period may be activated by a scanning signal transferred, e.g., in response to a vertical synchronization signal, to a plurality of pixels included in a display panel. As a result, the left eye image, the black image, the right eye image, and the black image may be displayed in sequence.

Meanwhile, in a shutter spectacles type 3D stereoscopic image system, shutter spectacles that recognize the left eye image and the right eye image may be required in response to the display panels displaying the left eye image and the right eye image in order to implement a 3D stereoscopic image.

In the left eye image period, at the time of scanning the display panel, a left eye part of the shutter spectacles is opened and a right eye part of the shutter spectacles is closed in response to a shutter synchronization signal. Similarly, in the right eye image period, the right eye part of the shutter spectacles is opened and the left eye part of the shutter spectacles is closed in response to the shutter synchronization signal.

Therefore, during a left eye image period, i.e., when the left eye of the shutter is open, the left eye image is displayed in the left eye image display period and the black image is displayed in the black image display period, such that the left eye image and the black image are sequentially recognized by the open left eye of the shutter spectacles. Further, during a right eye image period, i.e., when the right eye of the shutter is open, the right eye image is displayed in the right eye image display period and the black image is displayed in the black image display period, such that the right eye image and the black image are sequentially recognized by the open right eye of the shutter spectacles.

Scanning signals corresponding to a plurality of scanning lines of the display panel are transferred in response to the vertical synchronization signal, and a plurality of pixels emit light with a predetermined gray scale according to a left eye image data signal, a right eye image data signal, or a black data signal to correspond to the transferred scanning signals.

However, according to the driving of the existing stereoscopic display device, since the left eye image display period, the right eye image display period, and the two black image display periods configure one frame, the conventional stereoscopic display device may require operation at 240 Hz in order to display one frame of a stereoscopic image. That is, in the case of driving one frame of a conventional stereoscopic display device at 60 Hz, the scanning driving speed of the display panel may increase to 240 Hz at the time of inserting the black image, causing unstable driving and increased power consumption.

Further, while the black image is displayed and recognized after each of the left and right eye images in order to prevent a crosstalk phenomenon, i.e., mixing the left eye image and the right eye image at the time of opening the shutter spectacles, the left and right eye images may still be mixed in the conventional stereoscopic display device in spite of adjusting a light emitting duty.

Therefore, a driving method according to example embodiments where the left eye image and the right eye image may be fully separated from each other, while lowering the scanning driving speed of the display panel, will be described hereinafter. Further, the driving method of the stereoscopic display device according to example embodiments may maintain good luminance characteristics without increasing scanning driving speed, i.e., characteristics which require a rapid driving method in the conventional stereoscopic display device.

The stereoscopic display device and the driving method according to example embodiments will be described in detail with reference to FIGS. 1 to 4. A block diagram of a stereoscopic display device according to the exemplary embodiment will be described hereinafter with reference to FIG. 1.

Figure 1:
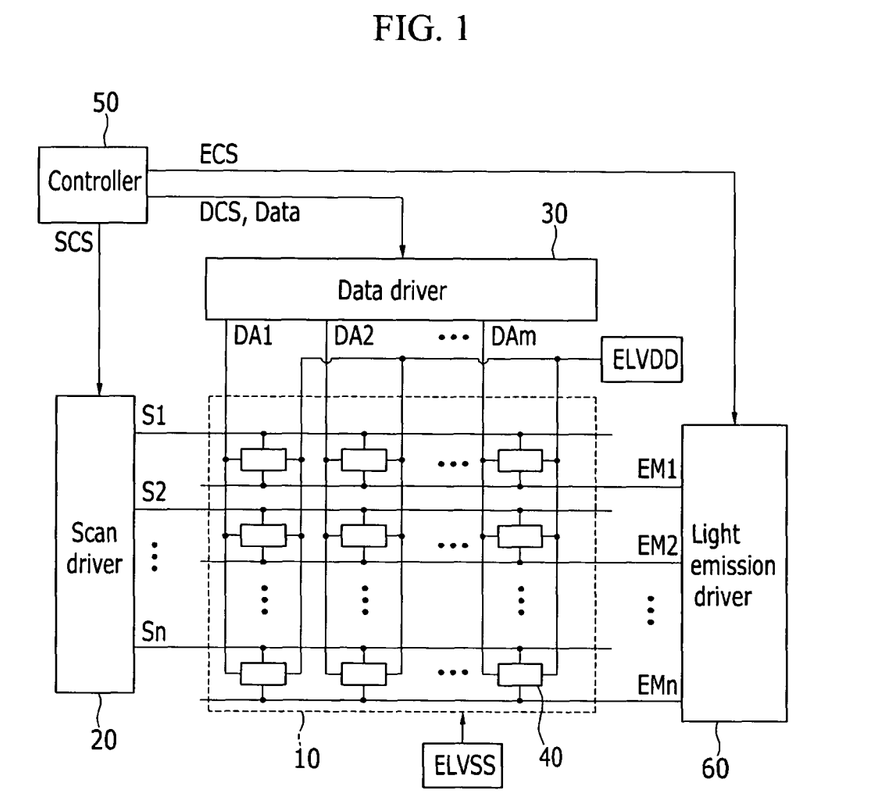
FIG. 1 illustrates a block diagram of a stereoscopic display device according to an exemplary embodiment.

Referring to FIG. 1, the display device according to an exemplary embodiment may include a display unit 10 including a plurality of pixels 40 connected to scan lines S1 to Sn, data lines DA1 to DAm, and light emission control lines EM1 to EMn, respectively, a scan driver 20 generating and supplying a scan signal to the scan lines S1 to Sn, a data driver 30 supplying an image data signal to the data lines DA1 to DAm according to an image signal input from the outside, a light emission driver 60 generating and supplying a light emission control signal to the light emission control lines EM1 to EMn, and a controller 50 controlling the scan driver 20, the data driver 30, and the light emission driver 60.

The controller 50 generates a data driving control signal DCS, a scan driving control signal SCS, and a light emitting driving control signal ECS in response to synchronization signals supplied from the outside. The data driving control signal DCS generated by the controller 50 is supplied to the data driver 30, the scan driving control signal SCS is supplied to the scan driver 20, and the light emitting driving control signal ECS is supplied to the light emission driver 60. In addition, the controller 50 converts an image signal supplied from the outside into an image data signal "Data" and supplies it to the data driver 30.

The stereoscopic display device according to the exemplary embodiment sequentially displays a left eye image and a right eye image corresponding to both eyes in order to display a stereoscopic image. That is, a time of one frame is classified into a left eye image display period displaying the left eye image and a right eye image display period displaying the right eye image.

Additional shutter spectacles for transferring each of the left eye image and the right eye image to each of both eyes are needed in order to display the stereoscopic image in a shutter spectacle scheme according to the exemplary embodiment. That is, the user should wear spectacles which allow an image to be transmitted in only the left eye during a period of displaying the left eye image and to be transmitted in only the right eye during a period of displaying the right eye image.

Accordingly, the image data signal "Data" supplied from the controller 50 to the data driver 30 includes a left eye image data signal and a right eye image data signal corresponding to the left eye image display period and the right eye image display period, respectively, for one frame.

The left eye image data signal is an image data signal recognized by transferring the image to a user's left eye through a left eye unit of the shutter spectacles. In addition, the right eye image data signal is an image data signal recognized by transferring the image to a user's right eye through a right eye unit of the shutter spectacles.

The data driver 30 supplies a plurality of left eye image data signals and a plurality of right eye image data signals to the plurality of data lines DA1 to DAm during the left eye image display period and the right eye image display period included in one frame, respectively.

The data driver 30 is synchronized at the time when a plurality of scan signals having a "gate-on" voltage are supplied to transmit the plurality of image data signals to the plurality of pixels 40 through the plurality of data lines DA1 to DAm, respectively. The "gate-on" voltage is a voltage of a predetermined level to turn on a switching transistor so as to transmit the image data signal to a gate electrode of the driving transistor which transfers a driving current to the OLED included in the pixel. This will be described below in detail with reference to the pixel structure of FIG. 2.

The scan driver 20 is synchronized at a start time of the left eye image display period or the right eye image display period to supply a scan signal having a "gate-on" voltage to a corresponding scan line among the plurality of scan lines S1 to Sn. The plurality of pixels 40 connected to the scan line to which the scan signal having the "gate-on" voltage is supplied among the plurality of scan lines S1 to Sn is selected and activated. The plurality of pixels 40 selected by the scan signal receives the left eye image data signal or the right eye image data signal from the plurality of data lines DA1 to DAm.

A driving frequency of the scan signal is controlled by the scan control signal SCS. In the exemplary embodiment, the driving frequency of the scan signal corresponds to one half of one frame. Since in the driving method of the stereoscopic display device of the example embodiment a black image display period is not inserted between the left eye image display period and the right eye image display period, the driving frequency of the scan signal may be lowered as compared with the related art.

The scan driver 20 supplies the plurality of scan signals by the subframe unit of the left eye image display period or the right eye image display period depending on the scan control signal SCS. The scan control signal SCS may include a horizontal synchronization signal for determining a transmission timing of the vertical synchronization signal and the scan signals to be synchronized at the start times of the left eye image display period and the right eye image display period, respectively.

The light emission driver 60 controls light emission of the pixels 40 according to the image data signal in response to the light emission driving control signal ECS transmitted from the controller 50. The light emission driver 60 generates and transmits the light emission control signal to the light emission control lines EM1 to EMn connected to the pixels in response to the light emission driving control signal ECS.

According to the exemplary embodiment, the plurality of light emission control signals transmitted to the light emission control lines EM1 to EMn may be classified into first light emission control signals and second light emission control signals to separately control the driving of the stereoscopic display device. The classification of the light emission control signals may be made according to a region divided by a plurality of pixel lines of the display unit 10. Driving processes of the first light emission control signal and the second light emission control signal will be described below in detail.

When the plurality of light emission control signals are applied to the light emission control transistor included in each of the plurality of pixels at a "gate-on" voltage level, the OLED emits light by the driving current depending on the image data signal and then the image is displayed. When the light emission control signals are applied at a "gate-off" voltage level, the current supplied to the OLED is interrupted and then the OLED does not emit light. That is, the stereoscopic display device may fully separate the left eye image from the right eye image by controlling light emission of the plurality of pixels via the light emission control lines EM1 to EMn and their corresponding light emission control signals, e.g., complete left and right eye image separation may be achieved solely by light emission control without insertion of black images.

A first power supply ELVDD and a second power supply ELVSS supply two driving voltages required for operating the plurality of pixels 40. Two driving voltages includes a high level first driving voltage supplied from the first power supply ELVDD and a low level second driving voltage supplied from the second power supply ELVSS.

Figure 2:
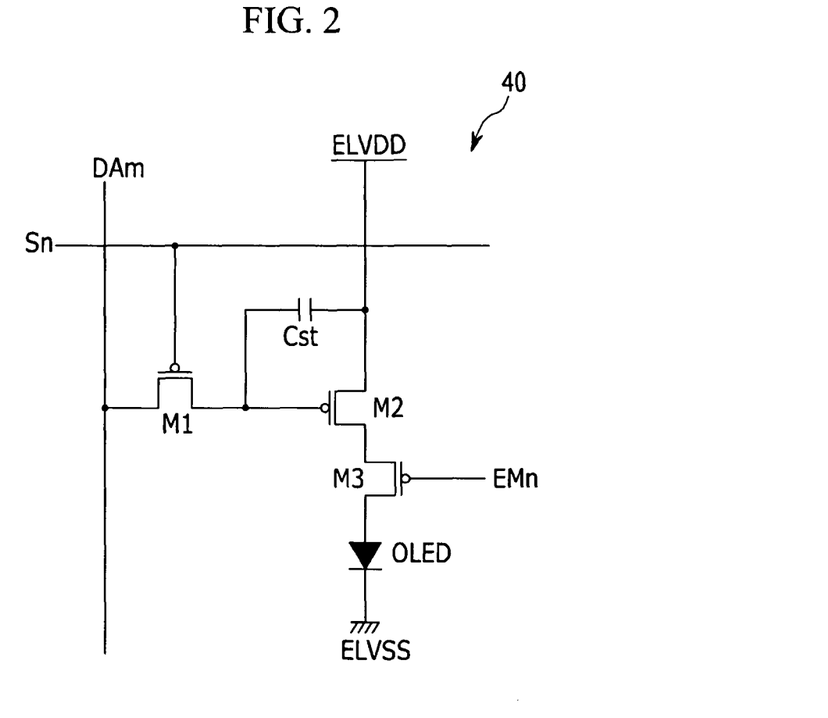
FIG. 2 illustrates a circuit diagram of a pixel in the stereoscopic display device of FIG. 1.

FIG. 2 illustrates an exemplary circuit diagram of a pixel 40 included in the display unit 10 of FIG. 1. Driving of each pixel in the stereoscopic display device according to the exemplary embodiment will be described with reference to FIG. 2.

Referring to FIG. 2, the pixel 40 may include a switching transistor M1, a driving transistor M2, a light emission control transistor M3, a storage capacitor Cst, and an OLED. Since FIG. 2 shows an exemplary embodiment of the driving circuit of the pixel, it is not limited thereto and a known pixel circuit structure in the corresponding field can variously be applied.

In detail, the switching transistor M1 includes a gate electrode connected to a corresponding scan line among the plurality of scan lines, a source electrode connected to a corresponding data line among the plurality of data lines, and a drain electrode connected to a contact point where one end of the storage capacitor Cst and the gate electrode of the driving transistor M2 are connected to each other.

The driving transistor M2 includes a gate electrode connected to the drain electrode of the switching transistor M1, a source electrode connected to the first power supply ELVDD, and a drain electrode connected to the source electrode of the light emission control transistor M3.

The light emission control transistor M3 includes a gate electrode connected to the light emission control line EM, a source electrode connected to the drain electrode of the driving transistor M2, and a drain electrode connected to an anode of the OLED.

One end of the storage capacitor Cst is connected to a contact point where the drain electrode of the switching transistor M1 and the gate electrode of the driving transistor M2 are connected to each other, and the other end is connected to the source electrode of the driving transistor M2. The storage capacitor Cst maintains a voltage difference between the gate electrode and the source electrode of the driving transistor M2, while the image is displayed.

The anode of the OLED is connected to the drain electrode of the light emission control transistor M3 and a cathode is connected the second power supply ELVSS.

When the switching transistor M1 is turned on by the scan signal transmitted through the corresponding scan line Sn, an image data signal is transmitted through the turned on switching transistor M1 to the gate electrode of the driving transistor M2.

The voltage difference between the gate electrode and the source electrode of the driving transistor M2 is a first driving voltage difference between the image data signal and the first power supply ELVDD, so a driving current flowing through the driving transistor M2 depends on the corresponding voltage difference. The driving current is transferred to the OLED, and the OLED emits light depending on the transferred driving current.

When the image data signal is the left eye image data signal, a corresponding pixel displays the left eye image by emitting light corresponding to the left eye image data signal.

When the image data signal is the right eye image data signal, a corresponding pixel displays the right eye image by emitting light corresponding to the right eye image data signal.

When the plurality of scan signals having the "gate-on" voltage level are supplied to a corresponding scan line among the plurality of scan lines S1 to Sn, the plurality of switching transistors M1 connected to the corresponding scan line are turned on. Each of the plurality of data lines DA1 to DAm is synchronized at the time when the scan signal having the "gate-on" voltage is supplied to receive the left eye image data signal or the right eye data signal.

The left eye image data signal or the right eye data signal, which is transmitted to the plurality of data lines DA1 to DAm through each of the turned-on plurality of switching transistors M1, is transferred to the driving transistor M2 of each of the plurality of pixels 40. Then, the OLED of each of the plurality of pixels 40 emits light or not during a corresponding display period.

In this case, although the left eye image data signal or the right eye data signal is transmitted, the corresponding driving current supplied to the OLED depends on a switching operation of the light emission control transistor M3. That is, when the light emission control signal which is transmitted through the light emission control line EMn connected with the light emission control transistor M3 is transmitted at the "gate-on" voltage level to turn on the light emission control transistor M3, the OLED emits light to display the image by the driving current depending on the corresponding image data signal. If the light emission control signal is transmitted with a "gate-off" voltage level to turn off the light emission control transistor M3, the OLED does not emit light.

Figure 3:
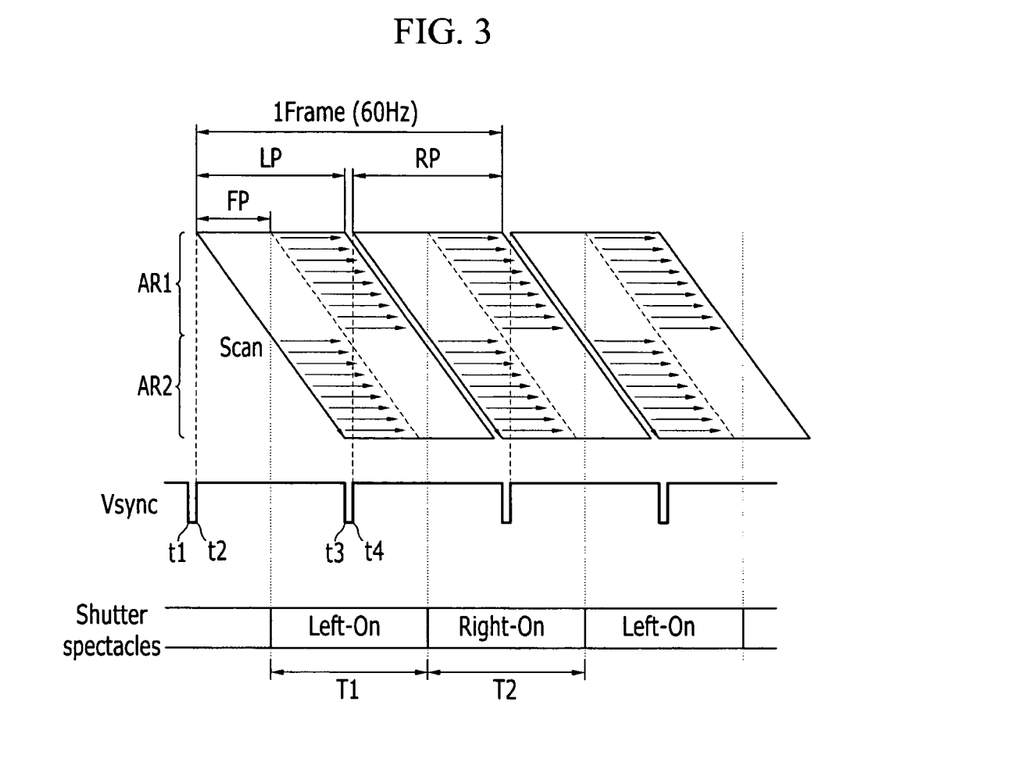
FIG. 3 illustrates a frame configuration diagram in a driving method of a stereoscopic display device according to an exemplary embodiment.
Figure 4:
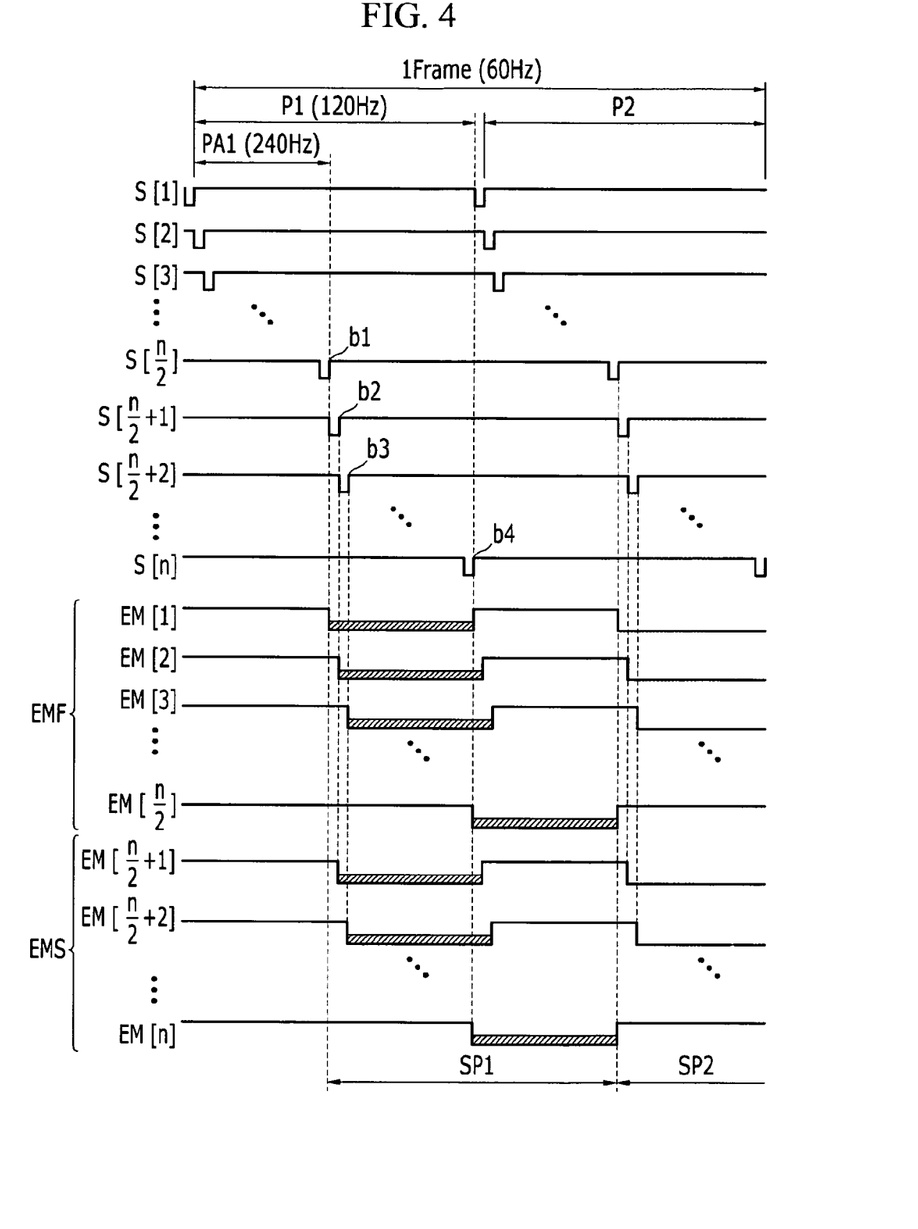
FIG. 4 illustrates a waveform diagram of a driving signal transferred to a pixel according to the driving method of FIG. 3.

FIG. 3 illustrates a frame configuration diagram of a driving method of the stereoscopic display device according to an exemplary embodiment. FIG. 4 illustrates a waveform diagram of a driving timeline of the scan signal and the light emission control signal transmitted to a pixel circuit in order to implement the driving method of FIG. 3.

In the stereoscopic display device of the exemplary embodiment of FIG. 3, one frame displaying the stereoscopic image is classified into a left eye image display period LP and a right eye image display period RP. For example, when one frame is driven at 60 Hz, each driving frequency of the left eye image display period LP and the right eye image display period RP is 120 Hz.

As illustrated in FIG. 3, transmission of the plurality of scan signals sequentially activating the plurality of pixels of the display unit begins at time t2, i.e., which is synchronized with the end transmission of the vertical synchronization signal Vsync. For example, the vertical synchronization signal Vsync is transmitted between time t1 and t2, a driving frequency of the plurality of scan signals which start to be transmitted at time t2 is 120 Hz, and the scan is finished at time t3 when the next synchronization signal Vsync is transmitted until time t4.

In this case, i.e., in the period between t2 and t3 illustrated in FIG. 3, the plurality of scan signals activates display of the left eye image. Accordingly, each of the plurality of pixels 40 of the display unit 10, i.e., a pixel activated by receiving a corresponding scan signal, receives the left eye image data signal to display the left eye image by emitting light with the data voltage. As described in FIG. 2, the light emission control signal is transmitted with the "gate-on" voltage level to turn on the light emission control transistor M3 in order that each activated pixel 40 emits light depending on the image data signal.

In the exemplary embodiment, the times when the plurality of activated pixels 40 start to emit light in accordance with the image data signals, i.e., to display the image, may be different, e.g., may be adjusted, by controlling the light emission control signals transmitted to the plurality of pixels 40. That is, the times the activated pixels 40 start to emit light may be different for each region of the display unit 10 by controlling the time when the light emission control signals transmitted to each of the plurality of pixels 40 is transmitted with the "gate-on" voltage level.

The plurality of light emission control signals transmitted to each of the plurality of pixels 40 in the display unit 10 are classified into a plurality of first light emission control signals and a plurality of second light emission control signals for each region of the display unit 10.

The plurality of first light emission control signals are signals supplied to the plurality of pixels in a first region AR1, i.e., a region including a first plurality of pixel lines in the display unit 10. The plurality of second light emission control signals are signals supplied to the plurality of pixels in a second region AR2, i.e., a region including a second plurality of pixel lines. The second plurality of pixel lines may be the remaining pixel lines, i.e., a result of excluding the first plurality of pixel lines in the first region AR1 from a total of the plurality of pixel lines in the display unit 10.

For example, as illustrated in FIG. 3, the first region AR1 may include pixel lines of the number of upper half of pixel lines among the entire pixel lines in the display unit. In other words, the first plurality of pixel lines in the first region AR1 may include a predetermined number of pixel lines, e.g., half of the total pixel lines, and may be positioned in an upper portion of the display unit 10. As further illustrated in FIG. 3, the second region AR2 may include pixel lines of the number of the rest lower half of pixel lines, i.e., the second plurality of the pixel lines may be in a lower portion of the display unit 10 below the first plurality of pixel lines.

The plurality of scan signals may be sequentially transmitted at a driving frequency corresponding to a half of one frame through the plurality of scan lines connected to respective pixel lines, i.e., all the pixel lines, in the display unit at time t2.

The plurality of first light emission control signals, i.e., which are transmitted to each of the first plurality of pixels in the first region AR1 of the display unit 10, are transmitted with the "gate-on" voltage level after the corresponding scan signals are transmitted. In other words, as illustrated in FIG. 3, a first period FP elapses for each pixel line between receipt of a scan signal and a corresponding first light emission control signal, i.e., the first period FP separates, e.g., completely separates along a timeline, the scan signal and a corresponding first light emission control signal. Thereafter, since the light emission control transistor M3 of a corresponding pixel is turned on, the OLED of the corresponding pixel emits light at a voltage depending on the image data signal.

The first period FP is a non-emission period of the OLED in the corresponding pixel because the plurality of first light emission control signals are at the "gate-off" voltage level. That is, each of the plurality of first light emission control signals transmitted to each of the plurality of pixel lines in the first region AR1 is driven with the first period, i.e., the non-emission period which the plurality of pixels in the corresponding pixel line does not emit light, as will be explained in more detail below with reference to period PA1 of FIG. 4.

In the exemplary embodiment of FIG. 3, the first plurality of pixels of the first region AR1 is scanned during the left eye image display period LP. Then, the left eye image data signal is transmitted, i.e., after the first period FP elapses for each pixel line, and the left eye image is displayed in response to the plurality of first light emission control signals.

The first period FP may be uniformly set throughout the first plurality of pixel lines in the first region AR1. That is, a length of the first period FP for each pixel line in the first region AR1 may be constant. Therefore, the plurality of first light emission control signals transmitted to each of the first plurality of pixel lines in the first region AR1 is transmitted with the "gate-on" voltage level after the uniform first period elapses for each pixel line. The first period FP may be a period corresponding to a half of the left eye image display period LP or the right eye image display period RP, e.g., the first period FP is 240 Hz in FIG. 3, but is not limited thereto and may be longer.

Meanwhile, in FIG. 3, the plurality of second light emission control signals transmitted to the second region AR2 are immediately transmitted with the "gate-on" voltage level after the scan signal corresponding to each pixel line of the second region AR2 is transmitted. That is, substantially no time elapses between receipt of a scan signal and a corresponding second light emission control signal in the pixel lines of the second region AR2. Thereafter, since the light emission control transistor M3 of the corresponding pixel is instantly turned on, the OLED of the corresponding pixel emits light at the voltage depending on the image data signal The plurality of pixels of the second region AR2 is scanned during the left eye image display period LP. Thereafter, the left eye image is displayed to correspond to the plurality of the second light emission control signals transmitted to the plurality of pixels of the second region AR2.

Light emitting duties of the plurality of pixels in the first region AR1 and the second region AR2 are the same for each pixel line. The light emitting period of each of the plurality of pixels in the first region AR1 and the second region AR2 may be a half of the left eye image display period LP or the right eye image display period RP to the maximum. However, it is not limited thereto and it may be equal to or less than a half of the left eye image display period LP or the right eye image display period RP. In FIG. 3, since the left eye image display period LP or the right eye image display period RP is 120 Hz, the light emitting period of each pixel may be 240 Hz.

In FIG. 3, the left eye image is displayed from the time when the plurality of pixels corresponding to the first pixel line in the first region AR1 start to emit light to the time when the plurality of pixels corresponding to the last pixel line in the first region AR1 finish the light emission, and from the time when the plurality of pixels corresponding to the first pixel line in the second region AR2 start to emit light to the time when the plurality of pixels corresponding to the last pixel line in the second region AR2 finish the light emission. In the exemplary embodiment, a period while the plurality of pixels of the plurality of pixel lines in the display unit 10 emit light to display the left eye image is substantially the same as a period while the scan signal is transmitted to the display unit 10, e.g., both periods may be 120 Hz.

In the exemplary embodiment of FIG. 3, since the start time of the scan signal is different from the light emission starting time of the display unit, the opening and closing of the shutter spectacles are controlled in response to the light emission starting time of the display unit. For example, a left eye unit of the shutter spectacles is open during a light emission period T1 in accordance with the left eye image data signal. The left eye image displayed on the display unit of the stereoscopic display device is recognized by the left eye through the left eye unit of the opened shutter spectacles.

After the vertical synchronization signal Vsync is transmitted at the time t4, the plurality of scan signals start to be transmitted to the display unit in order to display the right eye image. Operations of the plurality of scan signals and the plurality of light emission control signals which are transmitted to the pixel lines in the entire display unit during the right eye image display period RP are the same as described above with respect to the left eye.

A light emission period T2 depending on the right eye image data signal is from the time when the plurality of pixels in the first region AR1 and the second region AR2 start to emit light to the time when the light emission ends. A right eye unit of the shutter spectacles is opened during the period T2. The right eye image displayed on the display unit of the stereoscopic display device is recognized by the right eye through the right eye unit of the opened shutter spectacles.

FIG. 4 illustrates a driving timing diagram implementing the light emission control of the pixel according to the exemplary embodiment of FIG. 3. In FIG. 4, one frame is 60 Hz and includes a left eye image display period P1 and a right eye image display period P2 that are driven at 120 Hz. Since the left eye image display period P1 and the right eye image display period P2 are equally driven, only a driving process of the left eye image display period P1 will be described.

When a total number of pixel lines of the display unit 10 is n, a plurality of scan signals S[1] to S[n] are sequentially transmitted one by one during the left eye image display period P1 to a total of n scan lines which are connected to a total of n pixel lines of the display unit. In this case, a driving speed of the plurality of scan signals S[1] to S[n] is 120 Hz. The display unit 10 classifies the total n pixel lines into a first region AR1 and a second region AR2.

In FIG. 4, upper n/2 pixel lines among total n pixel lines in the display unit 10 are included in the first region AR1 and lower n/2 pixel lines are included in the second region AR2. A plurality of light emission control signals EM[1] to EM[n/2] transmitted to the plurality of pixel lines in the first region AR1 are a plurality of first light emission control signals EMF.

In the first region AR1, after the scan signals S[1] to S[n/2] are sequentially transmitted to corresponding pixel lines during a predetermined first period PA1, a plurality of pixels emit light corresponding to a left eye image in response to the plurality of the first light emission control signals EMF, respectively. In this case, the predetermined first period PA1 is ½ of the left eye image display period P1. In FIG. 4, after the scan signals are sequentially transmitted to corresponding pixel lines, i.e., when 240 Hz elapses, the pixels in the corresponding pixel line emit light. A light emitting period of the pixels emitting light is 240 Hz.

In detail, after the scan signal S[1] is transmitted to the first pixel line, the predetermined first period PA1 starts. During the predetermined first period PA1, the light emission control signal EM[1] is transmitted to the first pixel line in the first region AR1 at a high state as a "gate-off" voltage level, such that the plurality of pixels in the first pixel line does not emit light during the predetermined first period PA1. Next, the first light emission control signal EM[1] drops to a low state as a "gate-on" voltage level at time b1, i.e., the predetermined first period PA1 elapses, such that the plurality of pixels in the first pixel line emit light in accordance with the left eye image data signal.

Similarly, after the scan signal S[2] is transmitted to the second pixel line, the predetermined first period PA1 starts for the second pixel line. During the predetermined first period PA1, the light emission control signal EM[2] is transmitted to the second pixel line in the first region AR1 at a high state as a "gate-off" voltage level, such that the plurality of pixels in the second pixel line does not emit light during the predetermined first period PA1. Next, the second light emission control signal EM[2] drops to a low state as a "gate-on" voltage level at time b2, i.e., the predetermined first period PA1 of the second pixel line elapses, such that the plurality of pixels in the second pixel line emit light in accordance with the left eye image data signal.

As described above, the plurality of first light emission control signals EMF are transmitted to the plurality of pixel lines in the first region AR1 with the "gate-on" voltage level after the scan signal is transmitted to each pixel line and the same first period PA1 elapses.

The time b1 is a start time when a scan signal S[n/2+1] corresponding to the first pixel line in the second region AR2 is transmitted. A plurality of second light emission control signals EMS is a plurality of light emission control signals EM[n/2+1] to EM[n] transmitted to the plurality of pixel lines in the second region AR2. In the second region AR2, after the scan signals are sequentially transmitted to corresponding pixel lines, a plurality of pixels emit light in accordance with the left eye image in response to the plurality of respective second light emission control signals EMS. A light emission period of each of the pixels in the second region AR2 is 240 Hz like the pixels in the first region AR1.

In detail, the light emission control signal EM[n/2+1] is transmitted to the first pixel line in the second region AR2 at a low state as the "gate-on" voltage level, immediately after transmission of the scan signal S[n/2+1]. That is, transmission of the scan signal S[n/2+1] to the first pixel line in the second region AR2 continues between time b1 and time b2, and transmission of the light emission control signal EM[n/2+1] to the first pixel line in the second region AR2 begins at time b2. Thereafter, the plurality of pixels in the (n/2+1-th) pixel line, i.e., in the first pixel line of the second region AR2, emits light corresponding to the left eye image data signal.

Subsequently, the light emission control signal EM[n/2+2] transmitted to the second pixel line among the plurality of pixel lines in the second region AR2 is transmitted with the "gate-on" voltage level at the time b3, i.e., when transmission of the scan signal S[n/2+2] to the second pixel line of the second region AR2 is complete. Transmission of the light emission control signal EM[n/2+2] to the pixel line causes pixels in the pixel line to emit light.

As described above, the plurality of second light emission control signals EMS transmitted to the plurality of pixel lines in the second region AR2 are transmitted with the "gate-on" voltage level at the time when the scan signal is transmitted. For example, transmission of the scan signals and respective second light emission control signal EMS may overlap in time, e.g., an ending time of each scan signal may be synchronized with a beginning time of a respective second light emission control signals EMS.

In FIG. 4, a light emission period SP1 of all the pixels in the first region AR1 and the second region AR2 corresponding to the plurality of the first light emission control signals EMF and the plurality of the second light emission control signals EMS is a period which light is emitted in accordance with the left eye image data signal and the left eye unit of the shutter spectacles is open during the period. The light emission period SP1 of all the pixels is 120 Hz, the same as the left eye image display period P1.

In the exemplary embodiments of FIGS. 3 and 4, the "gate-on" voltage level of the light emission control signal is described as a low state because the transistors of the pixel circuit in FIG. 2 are PMOS, and the "gate-on" voltage level of the control signal may depend on a kind of the transistor. Other transistors types and voltage configurations are within the scope of the example embodiments.

In the exemplary embodiments of FIGS. 3 and 4, the driving speed of the scan signal scanning the first region AR1 is the same as the driving speed of the scan signal scanning the second region AR2, and the entire plurality of pixel lines are sequentially scanned. Further, the driving speed of the scan signal scanning the first region AR1 and the second region AR2 is the same as the driving speed of the plurality of first light emission control signals EMF and the plurality of the second light emission control signals EMS. In particular, in the exemplary embodiment, the driving speed of the scan signal is driven at 120 Hz.

Therefore, according to the exemplary embodiment, since the driving frequency of the scan signal is sufficiently lowered to 120 Hz, it may be possible to reduce power consumption and ensure the light emitting duty of the pixel emitting light depending on the image data signal to 50% of the left eye image display period P1 or the right eye image display period P2. Therefore, luminance characteristics of the stereoscopic display device may be maintained. Particularly, it may be possible to improve luminance characteristics by increasing luminance during the light emitting period of the pixel. Further, according to the driving method of the stereoscopic image of example embodiments, since each of the left eye image and the right eye image is displayed by being classified into the first region AR1 and the second region AR2 of the display unit, it may be possible to prevent crosstalk between the left eye and right eye images.

As such, according to the exemplary embodiments, it may be possible to provide a stereoscopic display device having full separation between a left eye image and a right eye image, while ensuring high luminance and relatively low driving frequency, e.g., as compared to an existing stereoscopic image driving frequency. As a result, it may be possible to implement a definite 3D stereoscopic image by preventing deterioration of luminance while fully removing a crosstalk phenomenon.

That is, according to the exemplary embodiments, since a light emitting scheme is controlled so as to prevent the left eye image and the right eye image from being mixed while ensuring driving stability and luminance characteristics of a stereoscopic display device, which is driven at a low speed by lowering a scanning speed, it may be possible to solve deterioration of display characteristics due to a crosstalk phenomenon to provide a high-quality stereoscopic screen. Further, according to the exemplary embodiments, since it is possible to separate the left eye image and the right eye image from each other without inserting an additional black image, it may be possible to prevent the crosstalk phenomenon without reduction of luminance.

In contrast, in order to prevent crosstalk of the left-eye image and the right-eye image when sequentially scanning from the upper part to the lower part of a conventional stereoscopic display device, a vertical blanking mode insertion (VBI) was attempted by controlling a driving time of shutter spectacles or inserting a black image between display periods of the left-eye image and the right-eye image. Further, in order to improve the luminance of a displayed image in the conventional stereoscopic display, a scheme of scanning each of the left-eye image and the right-eye image twice within one frame at high speed or adjusting an insertion method of the left-eye image, the right-eye image, and the black image have been attempted.

However, when conventional shutter glass display schemes of 3D stereoscopic image are used to prevent crosstalk, luminance may deteriorate. Further, when a high speed is used to improved luminance, e.g., use of high driving frequency in a large-sized display device, an image displaying operation may be inaccurate and the driving power consumption may be increased by the high driving frequency. As such, the price of the stereoscopic image display device may be increased.

While this invention has been described in connection with what is presently considered to be practical exemplary embodiments, it is to be understood that the invention is not limited to the disclosed embodiments. But, on the contrary, this invention is intended to cover various modifications and equivalent arrangements included within the spirit and scope of the appended claims. Further, the materials of the components described in the specification may be selectively substituted by various known materials by those skilled in the art. In addition, some of the components described in the specification may be omitted without the deterioration of the performance or added in order to improve the performance by those skilled in the art. Moreover, the sequence of the steps of the method described in the specification may be changed depending on a process environment or equipments by those skilled in the art. Accordingly, the scope of the present invention should be determined by not the above-mentioned exemplary embodiments but the appended claims and the equivalents thereto.

| <Description of symbols> | |
|---|---|
| 10: Display unit | 20: Scan driver |
| 30: Data driver | 40: Pixel |
| 50: Controller | 60: Light emission driver |

What is claimed is:

1. A stereoscopic display device, comprising:
a scan driver configured to transmit a plurality of scan signals to a plurality of scan lines;
a data driver configured to transmit a plurality of data signals to a plurality of data lines;
a light emission driver configured to transmit a plurality of light emission control signals to a plurality of light emission control lines;
a display unit including a first region and a second region, each of the first and second regions including at least one pixel line having a plurality of pixels connected to corresponding scan lines, data lines, and light emission lines; and
a controller configured to control the scan driver, the data driver, and the light emission driver, to generate an image data signal corresponding to each of a first view point image display period and a second view point image display period for one frame, and to supply the image data signal to the data driver,
wherein the light emission driver is configured to transmit a plurality of first light emission control signals to pixels to emit light in the first region and a plurality of second light emission control signals to pixels to emit light in the second region after corresponding scan signals are transmitted to respective pixels in the first and second regions, the first light emission control signals being separated from corresponding scan signals by respective first periods, and the second light emission control signals overlapping in time with corresponding scan signals.

2. The device as claimed in claim 1, wherein a light emission time of each of the plurality of pixels in the first region is the same as a light emission time of each of the plurality of pixels in the second region.

3. The device as claimed in claim 1, wherein a light emission time of the plurality of pixels in the first and second regions is equal to or lower than ½ of respective first and second view point image display periods.

4. The device as claimed in claim 1, wherein a light emitting duty of the plurality of pixels in the first and second regions is ½ of respective first and second view point image display periods.

5. The device as claimed in claim 1, wherein:
each of the plurality of the first light emission control signals is transmitted with a "gate-on" voltage level to a light emission control transistor in each of the plurality of pixels, the plurality of the first light emission control signals being synchronized with ending times of corresponding first periods, and
each of the plurality of the second light emission control signals is transmitted with a "gate-on" voltage level to the light emission control transistor, the second light emission control signals being synchronized with transmission ending times of corresponding scan signals.

6. The device as claimed in claim 1, wherein the first periods for the plurality of pixels in the first region have a substantially same length of time.

7. The device as claimed in claim 6, wherein the first periods are equal to or longer than ½ of the first view point image display period or the second view point image display period.

8. The device as claimed in claim 1, wherein:
a driving speed of the scan signal transmitted to each of the plurality of pixels in the first region is substantially the same as a driving speed of the plurality of first light emission control signals; and
a driving speed of the scan signal transmitted to each of the plurality of pixels in the second region is substantially the same as a driving speed of the plurality of second light emission control signals.

9. The device as claimed in claim 1, wherein the first region includes at least one pixel line of a total number of pixel lines in the display unit, and the second region includes remaining pixel lines of the display unit not included in the first region.

10. The device as claimed in claim 1, wherein the first region includes up to n/2 pixel lines among a total of n pixel lines in the display unit (n being a natural number), the n/2 pixel lines being arranged from a first pixel line of the display unit, and the second region includes remaining pixel lines of the display unit not included in the first region.

11. The device as claimed in claim 10, wherein the first periods are non-emission periods, a length of all the first periods being substantially the same.

12. The device as claimed in claim 11, wherein the non-emission periods are equal to or longer than ½ of a first view point image display period or a second view point image display period.

13. The device as claimed in claim 1, wherein a driving frequency of the scan signal transmitted to the plurality of pixel lines of the display unit equals two times a frequency of one frame.

14. The device as claimed in claim 1, wherein:
each of the plurality of pixels in each of the first region and the second region during the first view point image display period emits light in accordance with a first view point image data signal corresponding to the first view point image display period, a first view point shutter spectacles being turned on during the light emission, and
each of the plurality of pixels in each of the first region and the second region during the second view point image display period emits light in accordance with a second view point image data signal corresponding to the second view point image display period, a second view point shutter spectacles being turned on during the light emission.

15. A driving method of a stereoscopic display device having a display unit with first and second regions, each of the first and second regions including at least one pixel line having a plurality of pixels connected to corresponding scan lines, data lines, and light emission lines, and a controller configured to generate and supply first and second view point image data signals corresponding to respective first and second view point image display periods for one frame, the method comprising:
   transmitting a scan signal to each of the plurality of pixels in the first region and the second region during the first view point image display period;
   emitting light from the plurality of pixels in the first region in accordance with the first view point image data signal, the light emission in the first region and receipt of a corresponding transmitted scan signal being separated by a first period;
   emitting light from the pixels in the second region in accordance with the first view point image data signal, the light emission in the second region overlapping in time with a corresponding scan signal;
   transmitting a scan signal to each of the plurality of pixels in the first region and the second region during the second view point image display period;
   emitting light from the pixels in the first region in accordance with the second view point image data signal, the light emission in the first region and receipt of a corresponding transmitted scan signal being separated by a second period; and
   emitting light from the pixels in the second region in accordance with the second view point image data signal, the light emission in the second region overlapping in time with a corresponding scan signal.

16. The method as claimed in claim 15, wherein transmitting scan signals to the plurality of pixels includes using a scan signal driving speed in each of the first and second regions that is two times a frequency of one frame.

17. The method as claimed in claim 15, wherein:
   emitting light from the first and second regions in accordance with the first view point image data signal occurs when the first view point shutter spectacles is open; and
   emitting light from the first and second regions in accordance with the second view point image data signal occurs when the second view point shutter spectacles is open.

18. The method as claimed in claim 15, wherein emitting light from each of the plurality of pixels in the first region has a substantially same duration as emitting light from each of the plurality of pixels in the second region.

19. The method as claimed in claim 15, wherein a light emitting duty of each of the plurality of pixels in the first region and the second region is ½ of the first view point image display period or the second view point image display period.

20. The method as claimed in claim 15, wherein the first and second periods have a substantially same length.

21. The method as claimed in claim 20, wherein the first period and the second period are equal to or longer than ½ of the first view point image display period or the second view point image display period.

22. The method as claimed in claim 15, wherein a driving speed of the scan signal transmitted to the plurality of pixel lines in the first region and the second region is the same as the driving speed of the light emission control signal.

* * * * *